United States Patent [19]
Rudeen

[11] Patent Number: 5,550,364
[45] Date of Patent: Aug. 27, 1996

[54] METHOD AND APPARATUS FOR SPOTTER BEAM FORMATION USING A PARTITIONED OPTICAL ELEMENT

[75] Inventor: Robert W. Rudeen, Eugene, Oreg.

[73] Assignee: Intermec Corporation, Everett, Wash.

[21] Appl. No.: 215,852

[22] Filed: Mar. 21, 1994

[51] Int. Cl.⁶ .................................................. G06K 7/10
[52] U.S. Cl. .......................................... 235/462; 235/472
[58] Field of Search ................................... 235/462, 472, 235/467, 457

[56] References Cited

U.S. PATENT DOCUMENTS

| | | | |
|---|---|---|---|
| 4,760,248 | 7/1988 | Swartz et al. | 235/472 |
| 4,874,936 | 10/1989 | Chandler et al. | 235/494 |
| 4,877,949 | 10/1989 | Danielson et al. | 235/462 |
| 4,896,029 | 1/1990 | Chandler et al. | 235/494 |
| 4,988,852 | 1/1991 | Krishnan | 235/462 |
| 4,998,010 | 3/1991 | Chandler et al. | 235/494 |
| 5,019,699 | 5/1991 | Kosack | 235/472 |
| 5,075,538 | 12/1991 | Swartz et al. | 235/467 |
| 5,124,537 | 6/1992 | Chandler et al. | 235/462 |
| 5,146,463 | 9/1992 | Rando | 235/467 X |
| 5,155,343 | 10/1992 | Chandler et al. | 235/462 |
| 5,189,292 | 2/1993 | Batterman et al. | 235/494 |
| 5,241,166 | 8/1993 | Chandler | 235/494 |
| 5,254,853 | 10/1993 | Reich | 250/221 |
| 5,272,353 | 12/1993 | Barkan et al. | 235/467 X |
| 5,278,397 | 1/1994 | Barkan et al. | 235/462 |
| 5,296,689 | 3/1994 | Reddersen et al. | 235/467 |
| 5,347,121 | 9/1994 | Rudeen | 235/472 X |

FOREIGN PATENT DOCUMENTS

| | | | |
|---|---|---|---|
| 0450878A1 | 10/1991 | European Pat. Off. | G06K 7/10 |
| 0449634A2 | 10/1991 | European Pat. Off. | G06K 7/10 |
| 0524029A2 | 1/1993 | European Pat. Off. | G06K 7/10 |
| 63-67692 | 3/1988 | Japan . | |

*Primary Examiner*—Donald T. Hajec
*Assistant Examiner*—Michael G. Lee
*Attorney, Agent, or Firm*—Seed and Berry

[57] ABSTRACT

An optical element for causing a visible spotter beam emitted by a hand-held scanning bar code reader provides visible indications of the area of a surface which is being scanned by an invisible scanning beam. The optical element transforms the visible spotter beam, at its extreme of travel, into two pairs of cursor beams which are directed along predetermined trajectories relative to the trajectory followed by the scanning beam. The predetermined trajectories can be above and below, or to the left and right of the center of travel of the invisible scanning beam. In one embodiment, a method of identifying the proper focusing distance of the scanning reader is presented. The method identifies the focusing distance by making the pairs of cursor beams formed from the visible beam at its two angular extreme of travel to form a predetermined pattern indicating the proper focusing distance. The optical element can be made from segmented or gradient surfaces, such as Fresnel surfaces, or from a holographic optical element.

7 Claims, 9 Drawing Sheets

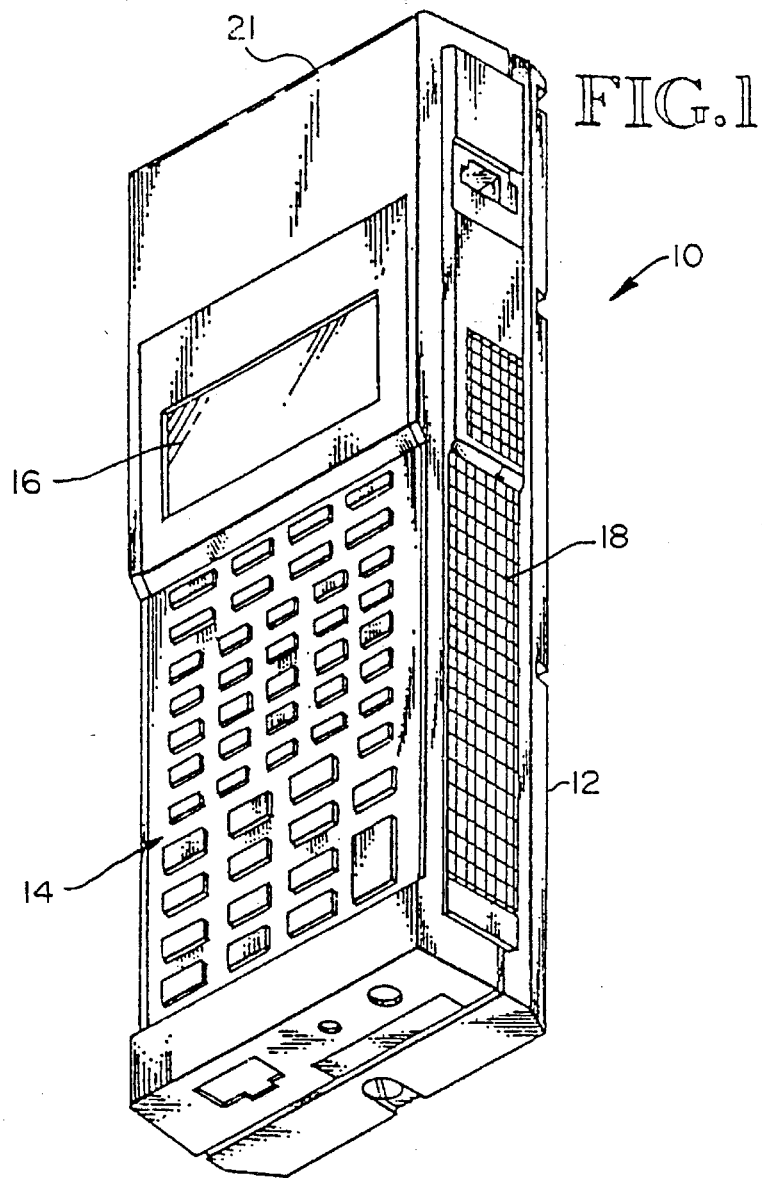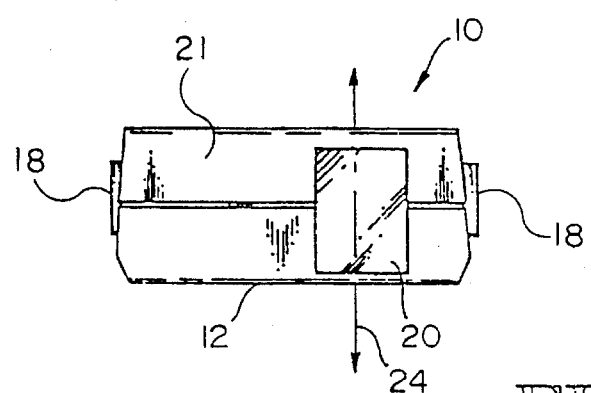

METHOD AND APPARATUS FOR SPOTTER BEAM FORMATION USING A PARTITIONED OPTICAL ELEMENT

TECHNICAL FIELD

This invention relates to the formation of a spotter beam on a target object and, more particularly, to spotter beam formation in conjunction with a bar code reader.

BACKGROUND OF THE INVENTION

A bar code reader typically uses a beam of light to read a bar code, which consists of alternating bars of differing reflectivities. The scanner then receives and interprets the fluctuations in the returning light that are caused by the bar code. It is known in the prior art to read bar codes by means of a hand-held wand which makes contact with the surface on which the bar code is printed. However, the need to make contact with the surface is frequently inconvenient and gives uninterpretable readings because the wand is not moved across the bar code with a sufficiently uniform velocity.

An alternative to a wand is a hand-held scanning reader which does not require physical contact with the bar code being read. A scanning reader typically produces a beam of light, called a scanning beam, which is scanned repetitively across a target object. If the scanning beam intercepts a bar code (or some other symbology), portions of it will be reflected back toward the scanning reader in a pattern corresponding to the pattern of the symbology encountered. This modulated light is detected by sensing circuitry in the scanning reader which in turn produces an electrical signal related to the returning light. The electrical signal is then analyzed to provide an indication of the relative widths of the bars and spaces of the bar code on the basis of relative time. That is, the widths of the alternating areas of different reflectivity are determined on the basis of the relative time duration of corresponding portions of the electrical signal, as related to the time for a single scan, also called the scanning time. This allows the scanning reader to be used with bar codes which have a wide variety of sizes, the important factor being that the relative widths of the elements of the bar codes be preserved. Accordingly, it is prferable that the scanning beam be scanned across the bar code at a substantially uniform rate in order to ease the task of interpreting the bar code.

In order to insure that the scanning beam is scanned at a substantially uniform rate, the scanning beam is typically reflected from a mirror within the scanning reader that moves in a repetitive pattern at a uniform rate. The mirror is generally driven by a small electrical motor under the control of electronic control circuitry. The mirror is typically either rotating at a constant speed or oscillating on the end of a shaft attached to a motor which can step between two extreme angular positions. Examples of rotating optical elements are shown in U.S. Pat. Nos. 4,025,761; 4,097,729; 4,450,350; 4,575,625; and 4,692,603. Examples of oscillating mirrors, also called dithering mirrors, are shown in U.S. Pat. Nos. 4,593,186; 4,736,095; and 4,808,804. In hand-held applications, a dithering mirror is generally preferable, since it can be made both lighter and more compactly than a rotating optical element.

The light source in a modem bar code scanner is generally a very low power solid state laser diode, since such devices are efficient and light, and can be made reliably and relatively inexpensively. Such devices may emit visible or invisible light. Where the light is visible, the scanning beam produces a visible line on the target object which helps the user to align the reader to a target object.

In many applications, the laser light is not visible to an operator. Thus, the operator is not able to determine if a beam of laser light is being emitted. Additionally, the user does not have any guide by which to align or focus the laser light. It is helpful to provide a visually discernible guide to indicate the existence and direction of the laser light to permit a user to "target" or "spot" the beam of laser light on a target object. Such beams are referred to as spotter beams.

It is known in the art to produce a spotter beam to aid the alignment of an invisible scanning beam with a target object. The spotter beam typically is a visible light beam directed toward the target object which presents a visible image near to, or superimposed upon, the scanning beam. The position of the visible image indicates to an operator the location of the invisible scanning beam's contact with the target object. The light source used for a spotter beam is typically a commercially available light-emitting diode (LED).

One known method of producing a spotter beam alternates the emission of the laser light with the visible light. This requires careful control of the timing of the laser diode and visible light LED so that the laser light is terminated during a short period of time during which the visible light LED is activated. In systems employing this method, the visible light emission is directed optically along the same scan path as the laser light. A collinear, visible light image and the invisible scanning beam are alternately shown on the target objects. Readers employing either of the above (i.e., visible scanning beam or invisible scanning beam combined with a visible spotter beam) typically produce a single, linear visible image for the user's reference. They do not provide any substantial indication of an appropriate focusing distance or parallel alignment of the scanning reader to the target object.

Another problem with such readers is that the dithering mirror stops at each angular extreme and returns over the same segment, causing the visible light from either the scanning beam or the spotter beam to dwell at the end of its travel and produce an undesirable bright spot at each end of the visible image.

SUMMARY OF THE INVENTION

It is an object of the present invention to provide an optical system for providing an improved alignment beam.

It is a further object of the present invention to provide an alignment beam that indicates when a scanning beam is properly focused on a target surface that may bear a symbology.

These and other objects can be provided by an apparatus for forming a visible scanning beam of light directed toward a target object. The apparatus comprises a source of a beam of visible light, and a scanning apparatus receiving the beam of visible light and causing it to scan over a predetermined scan path along an optical axis forming a visible scanning beam. The apparatus further comprises an optical element receiving the scanning beam and forming it into cursor beams when the scanning beam is located in predetermined portions of the predetermined scan path and causes the spotter beam to be transmitted substantially unaffected in all other portions of the predetermined scan path.

In another aspect, the invention comprises an apparatus for focusing a scanning beam on a surface of a target object. The apparatus comprises a source of a beam of visible light, and a scanning apparatus receiving the beam of visible light and causing it to scan over a predetermined scan path to define a scanning beam. The apparatus further comprises an optical element receiving the scanning beam that forms the scanning beam into a pair of cursor beams when the scanning beam is located in predetermined portions of the predetermined scan path, thus forming a predetermined pattern of cursor images on the target object when the reader is positioned such that the scanning beam is focused on the target object.

In another aspect, the invention is an apparatus for focusing an invisible scanning beam on a surface of a target object. The apparatus comprises a source of a beam of invisible light and a source of a beam of visible light, and a scanning apparatus receiving the beam of invisible light and the beam of visible light and causing them to scan over a predetermined scan path to define a spotter beam. The apparatus further comprises an optical element receiving the spotter beam that forms the spotter beam into a pair of cursor beams when the spotter beam is located in predetermined portions of the predetermined scan path, thus forming a predetermined pattern of cursor images on the target object when the scanning beam is focused on the target object.

In a further aspect, the invention is a method for forming a visible spotter beam of light on a target object. The method comprises the steps of (a) forming a beam of visible light; (b) causing the beam of visible light to scan over a predetermined scan path to define a scanning beam; and (c) intercepting the scanning beam with an optical element; and (d) causing the scanning beam to be transmitted substantially unaffected when the scanning beam is located in a first portion of the optical element and causing the scanning beam to form a cursor in a second portion of the optical element.

In a still further aspect, the invention is a method for focusing an invisible beam of light on a target object. The method comprises the steps of (a) forming a beam of visible light; (b) causing the beam of visible light to scan over the predetermined scan path to form a spotter beam; (c) receiving the spotter beam with an optical element; (d) causing the spotter beam to be transmitted in a portion of the optical element; (e) causing the spotter beam to be formed into a first cursor beam, directed in a first direction when the spotter beam is in a scanned portion of the optical element; (f) causing the spotter beam to be formed into a second cursor beam directed in a second direction when the spotter beam is in a third portion of the optical element; (g) directing the cursor beams onto a target object to form a pair of cursor images; and (h) adjusting the positions of the cursor images to produce a desired pattern of cursor images on the target object by adjusting the distance between the optical element and the target object.

BRIEF DESCRIPTION OF THE DRAWINGS

FIG. 1 is a perspective view of a hand-held scanning laser bar code reader.

FIG. 2 is a top plan view of the scanning laser bar code reader of FIG. 1.

DETAILED DESCRIPTION OF THE INVENTION

Figure 3:
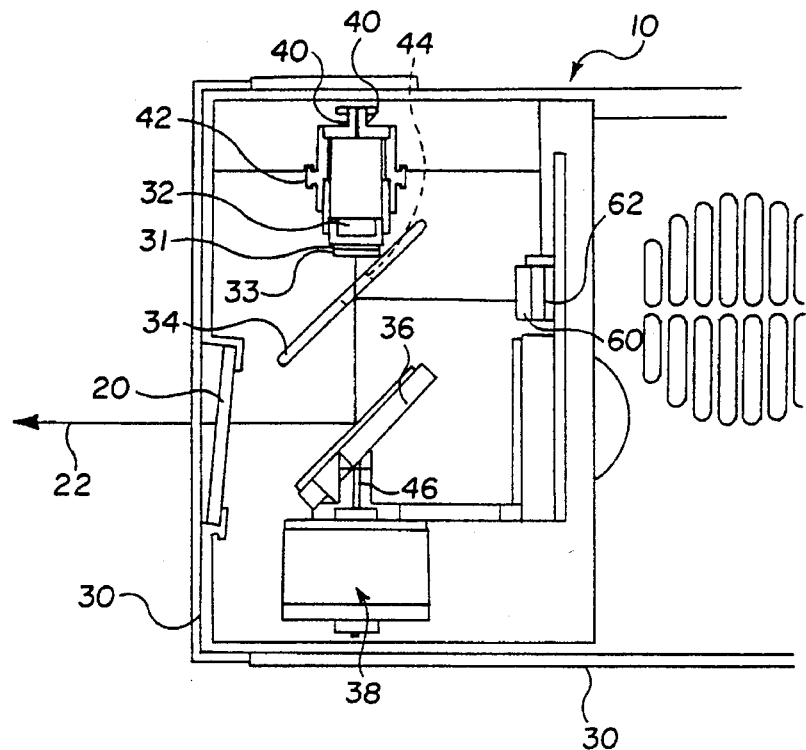
FIG. 3 is an enlarged perspective view of a portion of optics of the scanning laser bar code reader of FIG. 1 shown removed from its case.

A hand-held scanning laser bar code reader 10 incorporating the present invention is shown in FIGS. 1 and 2. The scanning reader 10 includes electronic circuitry and optical components contained within a case 12. It also includes a keyboard 14 and liquid crystal display (LCD) 16 for the exchange of information with a user, such as data read from a bar code or feedback for programming the scanning reader 10.

Upon actuating a pair of opposed triggers 18 (only one being shown in FIG. 1), the scanning reader 10 is activated, and, as will be described subsequently, produces a scanning beam of laser light. The scanning beam passes through a window 20 placed in a top end 21 of the scanning reader 10, as shown in FIG. 2. The scanning occurs in a scanning plane 24 along the directions shown in FIG. 2 by a pair of arrows. The scanning beam is projected outwardly from the scanning reader 10 within the scanning plane 24. If the scanning beam reaches a surface, some of the optical energy of the scanning beam impinging on the surface is reflected and returns to the scanner through the window 20 where it can be detected in a conventional manner. If the reflecting surface upon which the scanning beam impinges contains a symbology, such as a bar code, the optical energy returning to the scanning reader 10 will be modulated by the pattern of reflectivities which the bar code symbology contains. The modulated optical energy received by the scanning reader 10 upon detection produces an electrical signal which can be amplified and processed by circuitry in accordance with techniques which are conventional to those skilled in the art of bar code reader design.

With reference to FIG. 3, the wavelength of the scanning beam produced within the scanning reader 10 is determined by a laser diode 32 which is contained in the scanning reader 10. The laser diode 32 preferably produces human-visible light.

The laser diode 32 is mounted within the reader 10 and is supplied with electrical power through electrical leads 40 by conventional electronic circuitry contained elsewhere in the scanning reader 10. Associated with the laser diode 32 is a holder 42 which contains and holds, as a fixed assembly, lenses and other optical elements which are required to shape the scanning beam into the desired form. The scanning beam is generated from a beam of laser light produced by the laser diode 32 by passing the beam of laser light from the laser diode 32 through one or more lenses 31 to aid in focusing the beam of laser light at a particular distance exterior to the scanning reader 10 and through an aperture stop 33 to reshape the beam to have a desired cross-section.

After the beam of laser light passes through the optical elements supported by the holder 42, it passes through a hole 44 in the turning mirror 34. The beam of laser light then travels to the dithering mirror 36. The dithering mirror 36 is attached to the motor 38 by a shaft 46, which causes the dithering mirror 36 to oscillate or "dither" about an axis aligned with the shaft 46 in a conventional manner.

The scanning plane 24 (see FIG. 2) is perpendicular to the axis aligned with the shaft 46. The beam of laser light reflects from the dithering mirror 36 and is directed through a predetermined scan path to form the scanning beam. The scanning beam then passes through the window 20 at a position within the scanning plane 24, depending on the angular position of the dithering mirror 36.

Figure 5:
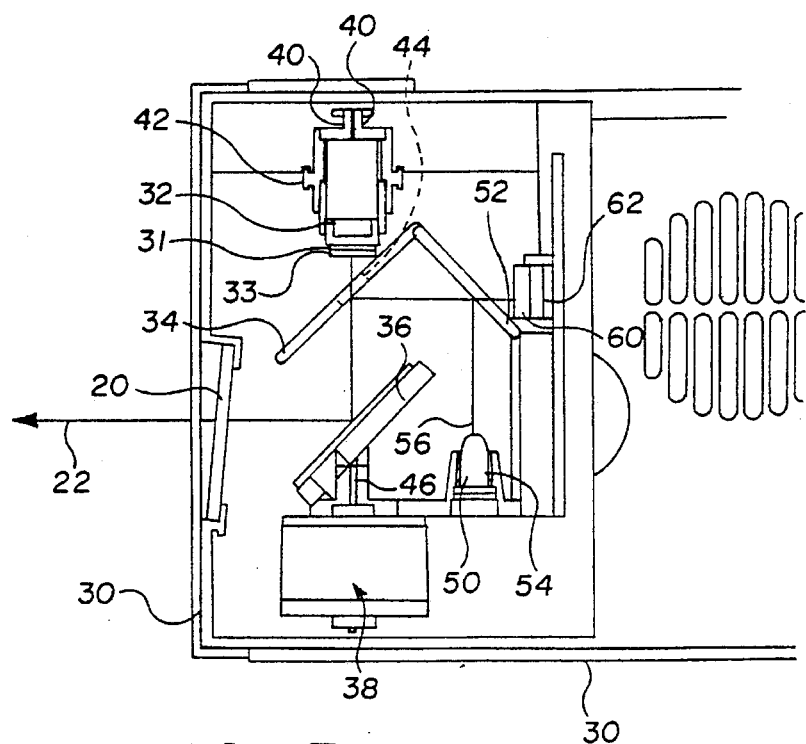
FIG. 5 is an enlarged top view of a portion of the optics of an alternative embodiment of the scanning laser bar code reader of FIG. 1 including optical elements for producing a spotter beam shown removed from its case.

With reference to FIG. 5, the alternative embodiment of the reader is substantially similar to the reader of FIG. 3, with the addition of components for producing visible spotter beam and the use of a laser diode 32 emitting only invisible light (i.e., light which is beyond the wavelength of human vision). The additional components include an LED 50 and a dichroic mirror 52. The LED 50 is chosen so that the light it emits is at a wavelength that is visible to the human eye. The LED 50 is contained within a housing 54 that shapes the light emitted onto a narrow beam, suitable for defining a very narrow spot on a surface onto which it is be projected. The LED 50 emits light toward the dichroic mirror 52 which reflects the light from the LED 50 toward the turning mirror 34. Note that the dichroic mirror 52, because it is dichroic, transmits light at the wavelength of the laser diode 32 while reflecting light at the wavelength of the LED. The turning mirror 34 reflects the light from the LED 50 toward the dithering mirror 36. From this point on, the light from the LED 50 follows substantially the same path as light from the laser diode 32, providing a visual indication to a user of the position of the light of the laser diode 32. This visible beam is referred to herein as a spotter beam.

In the embodiments of FIGS. 3 and 5, any optical energy that is received due to reflections from a target, such as one having a bar code symbology, is transmitted through the window 20. The returning optical energy is reflected by the dithering mirror 36 onto the turning mirror 34 to the photodiode 60 through the filter 62 and in the case of the embodiment of FIG. 5, through the dichroic mirror 52. The photodiode 60 is aligned so that it receives essentially all of the received light energy transmitted through the filter 62. This maximizes the strength of the signal produced by the photodiode 60, thereby improving the performance of the electronic circuitry which processes the signals produced by the photodiode 60.

Figure 4:
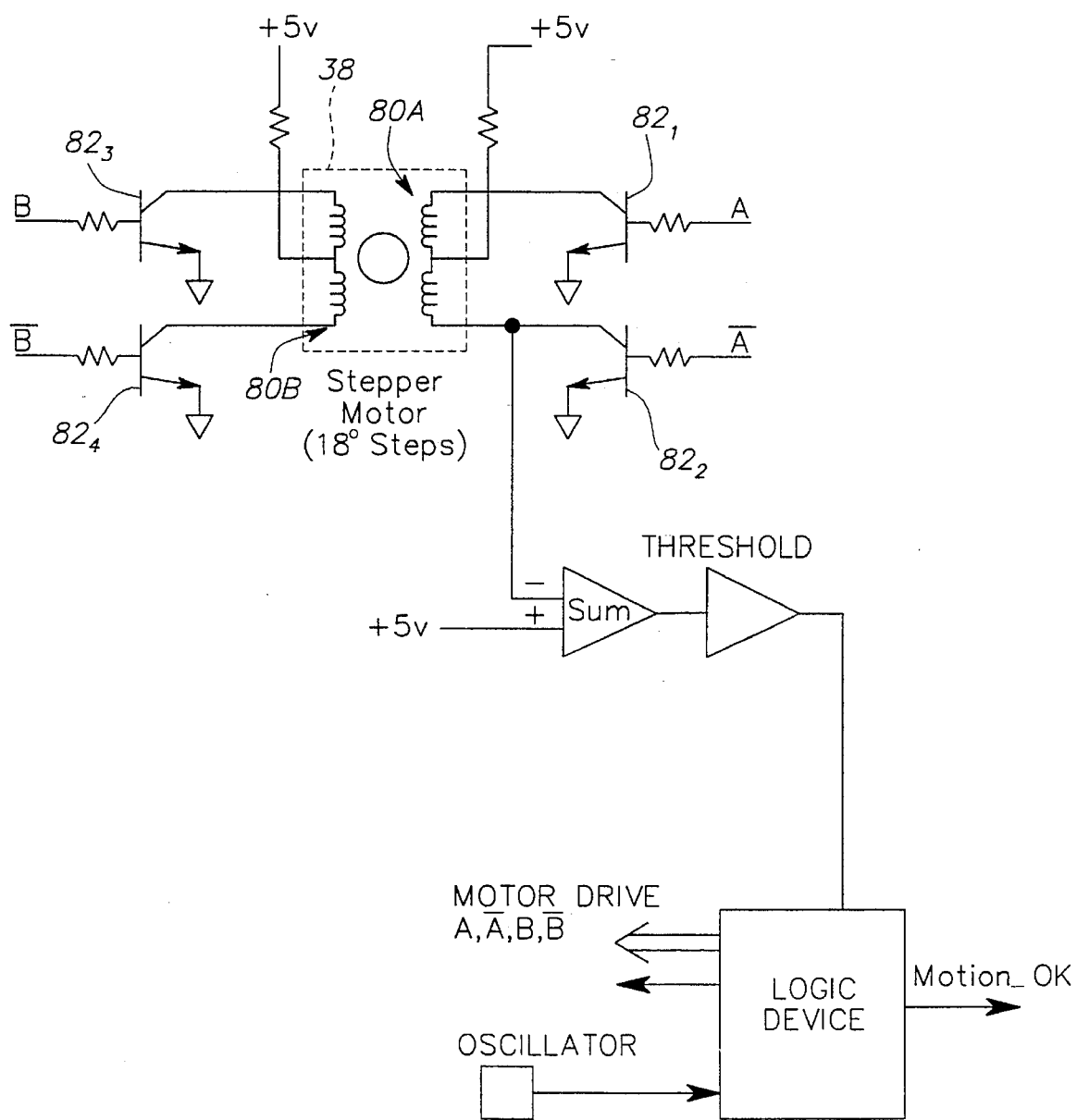
FIG. 4 is a schematic diagram of the circuitry of the motor drive electronics of the scanning laser bar code reader shown in FIG. 1.

As can be seen from the above discussion, the angular ranges of travel of the scanning beam and the spotter beam in the embodiment of FIG. 4 are controlled largely by the dithering mirror 36, driven by the motor 38. The motor 38 is a stepper motor having the capability of producing steps which are eighteen degrees wide. As shown in FIG. 4, the motor 38 includes two windings 80A and 80B. Each of the windings 80A and 80B is center-tapped, dividing the winding into two legs. The center of each of the windings is held at a substantially fixed first voltage, such as the supply voltage for the electronic circuit of the scanning reader 10. Typically, the supply voltage is five volts. Each of the legs of the two windings 80A and 80B can be excited separately. To accomplish this, the end of each of the legs is capable of being grounded (or held at some other voltage, if appropriate), respectively, through a circuit including one of the four transistors $82_1$, $82_2$, $82_3$, $82_4$. For example, if an appropriate signal is applied at line A, the gate of the transistor $82_1$ will cause current to pass through the upper leg of the winding 80A. This will cause the motor 38 to rotate slightly. If signals are applied to lines A, $\overline{A}$, B, and $\overline{B}$ in the correct order, the motor 38, and consequently, the dithering mirror 36, can be caused to oscillate. This, in turn, will cause the scanning beam to be scanned through the window 20, as described above. If the signals are applied properly to the lines A, $\overline{A}$, B, and $\overline{B}$, the scanning beam can be caused to move in successive passes through along the predetermined scan path having two angular extremes, producing the scanning beam. If desired, the motion of the scanning beam between the two angular extremes can be made to have a substantially constant angular velocity.

By selectively energizing the windings 80A and 80B, the dithering mirror 36 can be rotated, sweeping the scanning beam through its full angular range of travel. The angular range of travel occurs between two predetermined angular extremes. By repetitively energizing the windings, the dithering mirror 36 can be caused to scan the beam repeatedly through this angular range of travel. For example, if it is desired to cause the dithering mirror 36 to scan the scanning beam and the spotter beam forty times per second, a square wave train at a rate of approximately 800 Hz can be used to drive the stepper motor windings.

When no sweep is desired, the dithering mirror 36 is kept at one end of its angular range of travel. The dithering mirror 36 is kept in place by activating the lower legs of the two windings 80A and 80B, while the two upper legs are not activated.

At the end of each scan, the dithering mirror 36 stops and reverses its direction of travel so as to return through the angular range of travel to its original position. The scanning beam thus passes through a region at the angular extreme of the scan, stops, and quickly passes back through the same region. In prior art scanning systems, this resulted in a perceived bright spot at each end of a scan. To prevent this bright spot, it is known to inhibit the scanning beam during the time it is in the region at the end of the scan. This can be done by switching off the visible light source or by blocking the optical path of the scanning beam when the dithering mirror 36 is near its angular extremes.

Figure 6A:
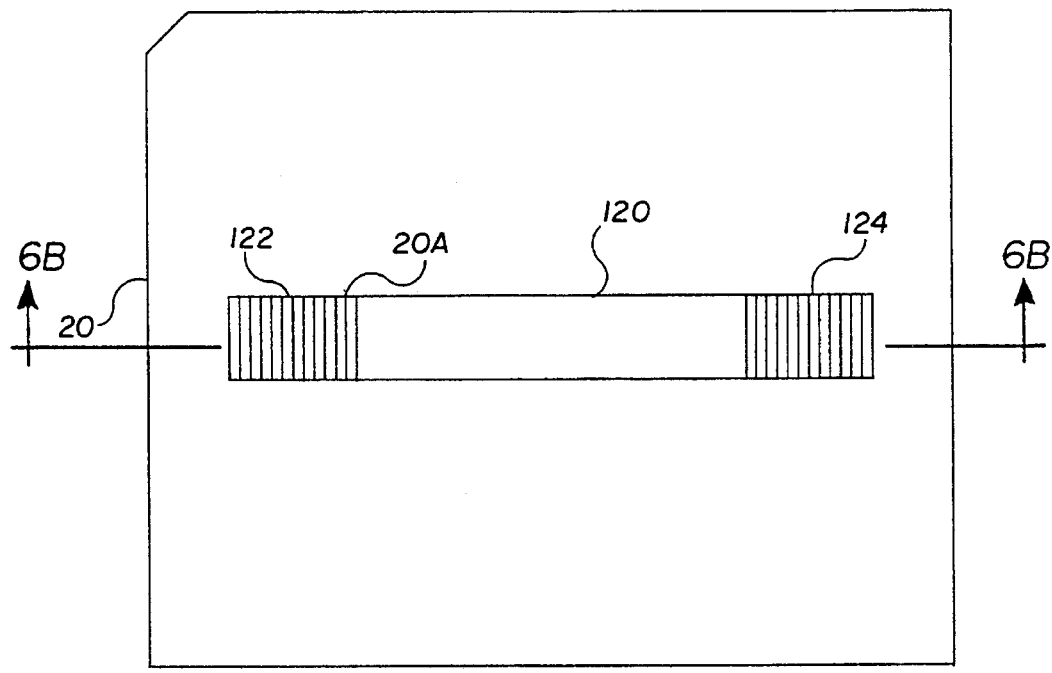
FIG. 6A is an enlarged plan view of a first embodiment of the optical element of the scanning laser bar code reader of FIG. 1.
Figure 6B:
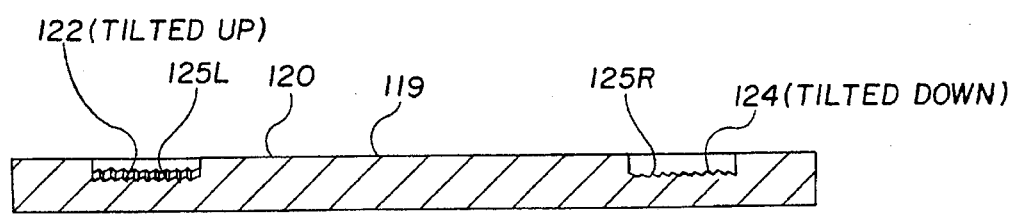
FIG. 6B is a cross-sectional view taken substantially along line 6A–6B of FIG. 6A.

Rather than inhibit the bright spot, the present invention utilizes it as an aid to focusing and alignment by using it to form a visible "cursor image" for a user. The cursor image is typically brighter than the scanning beam making it relatively easily locatable and identifiable by a user as compared with the scanning beam. The cursor image is produced using an optical element 20A shown in FIGS. 6A and 6B which is incorporated into the window 20. The optical element 20A includes a first and second end portions 122, 124 with a central portion 120 therebetween.

The optical element 20A intercepts the visible light produced by the laser diode 32 and formed into the scanning beam as described above, and redirects the visible light depending upon which portion of the optical element 20A the scanning beam strikes. The central portion 120 is essentially flat having an upper surface 119 with a flatness of less than 10 fringes per inch. The central portion transmits the scanning beam which strikes it directly therethrough without substantial refraction or focusing.

Figure 10:
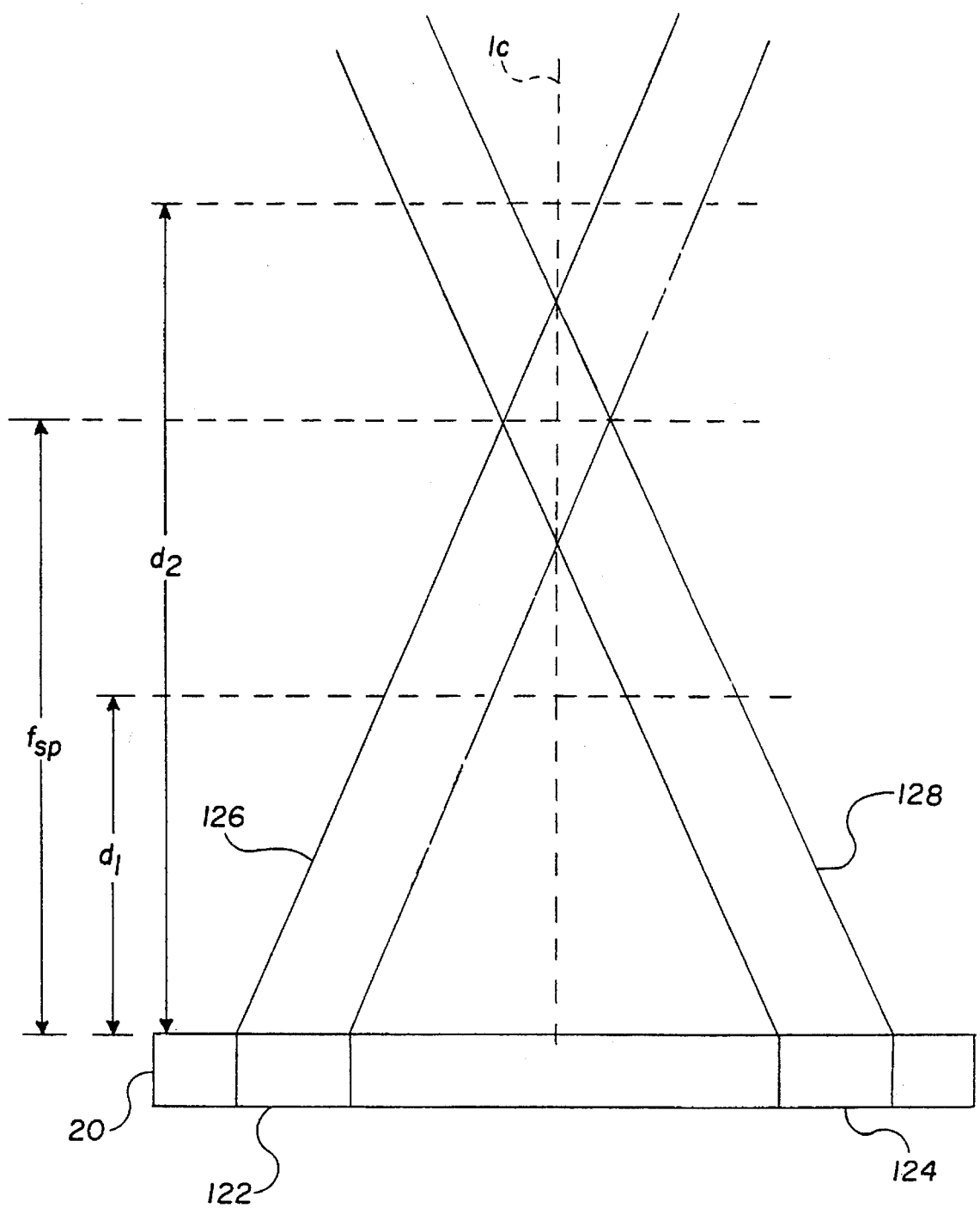
FIG. 10 is a schematic drawing illustrating focusing using the scanning laser bar code reader of FIG. 1.

The first and second end portions 122 and 124 of the optical element 20A redirect the visible scanning beam when it strikes them and each forms a distinct cursor beam 126, 128 from the angularly extreme portion of the scanning beam, as described below with respect to FIG. 10. Each of the first and second end portions 122 and 124 of the optical element 20A has a diffractive, segmented, sawtooth surface 125L and 125R which is tilted slightly up and down, respectively with respect to the upper surface 119 as can best be seen from FIG. 6B. The segmented surfaces 125L, 125R are formed on the outer surface of the window 20 and are protected by hard coating the outer surface.

Figure 7A:
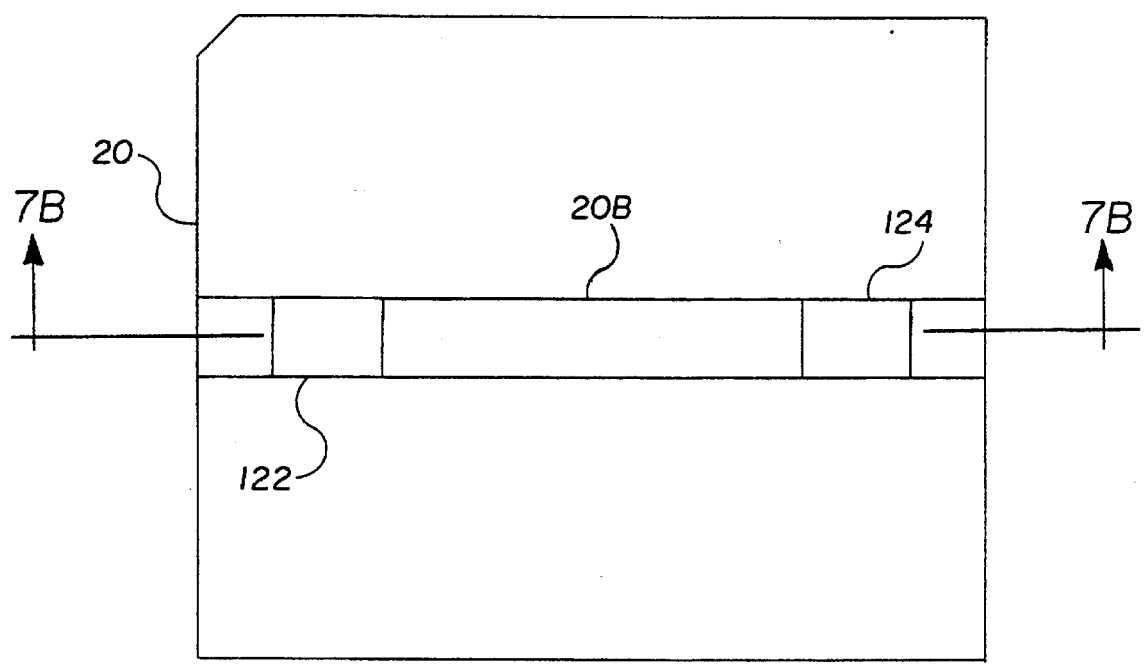
FIG. 7A is an enlarged plan view of a second embodiment of the optical element of the scanning laser bar code reader of FIG. 1.
Figure 7B:
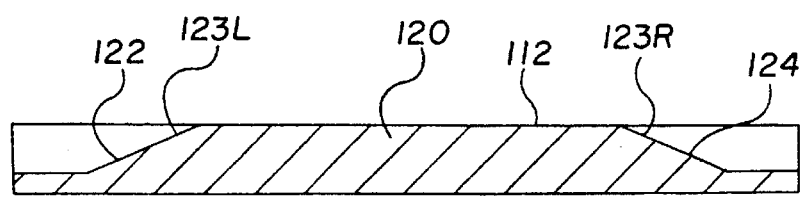
FIG. 7B is a cross-sectional view taken substantially along line 6A–6B of FIG. 7A.

Alternatively, as shown in FIGS. 7A and 7B, the first and second end portions 122, 124 of the optical element may be formed from gradient surfaces 123L, 123R or may be formed from holographic or gradient index regions within or atop the optical element 20A. The following discussion relates to the embodiment of FIGS. 6A and 6B; however, one skilled in the art will understand that the discussion applies equally to the alternative embodiments employing gradient or holographic end portions.

Figure 8:
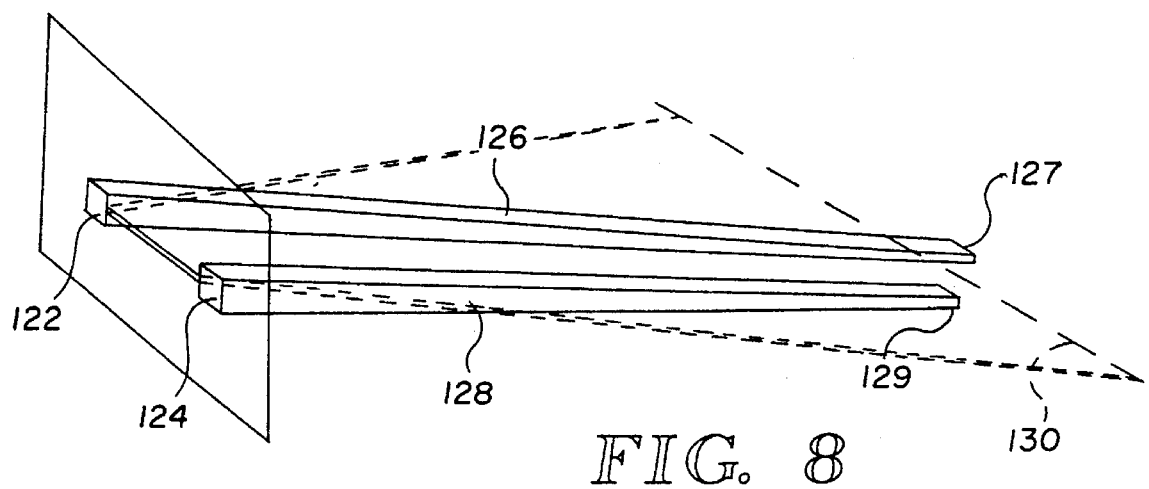
FIG. 8 is a schematic drawing of a portion of the visible beams formed by the scanning laser bar code reader of FIG. 1.

FIG. 8 is a first diagrammatic view of the operation of the inventive reader. The discussion of the operation of the reader refers to the visible scanning beam throughout. However, one skilled in the art will understand that the discussion applies equally to combination of the visible spotter beam and an invisible scanning beam of the alternative embodiment of FIG. 5. The portion of the scanning beam received by the central portion 120 is transmitted substantially unaffected. Upon striking a target object the visible scanning beam will form a visible scan line 131 on the target object formed by the intersection of the scan plane 24 and the target object. The portion of the scanning beam projected through the first and second end portions 122 and 124 is redirected by each to create the pair of cursor beams 126 and 128, respectively. Because the segmented surfaces 125L and 125R are tilted with respect to the plane of the upper surface 119, the cursor beams 126 and 128 are directed out of the scanning plane 24. Because the tilting is in opposite directions, the cursor beams 126, 128 are made to lie respectively above and below the scan line 130. The cursor beams 126 and 128 will then form a pair of visible light spots or cursor images 127, 129 on a target object, on opposite sides of the scan line 130. This allows the user to align the scanning beam by vertically bracketing the area which the user wishes to scan between the cursor images 127, 129. The scanning beam and the end portions 122, 124 thus form two optical sources emitting cursor beams 126, 128 directed toward the image plane.

Figure 9:
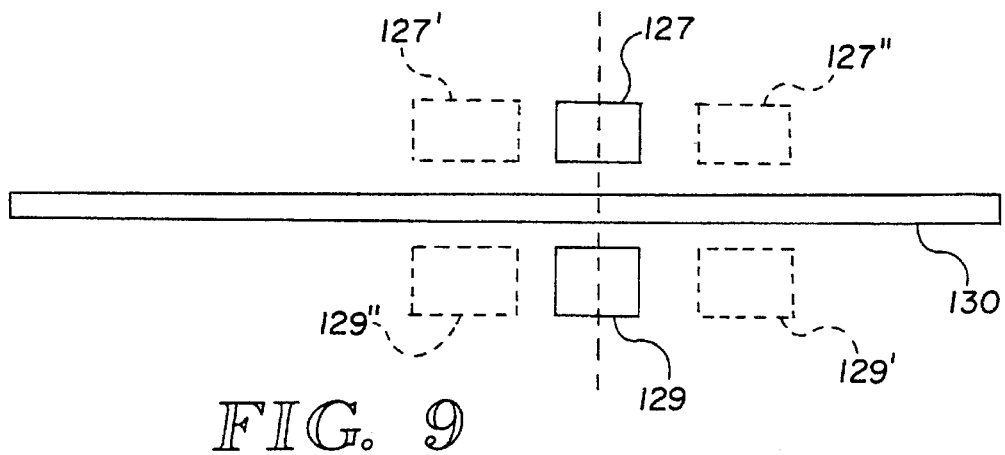
FIG. 9 is a schematic drawing of cursor images produced by the scanning laser bar code reader of FIG. 1 with the optical element of FIGS. 6A and 6B demonstrating use for determining a focusing position of the bar code reader.
Figure 13:
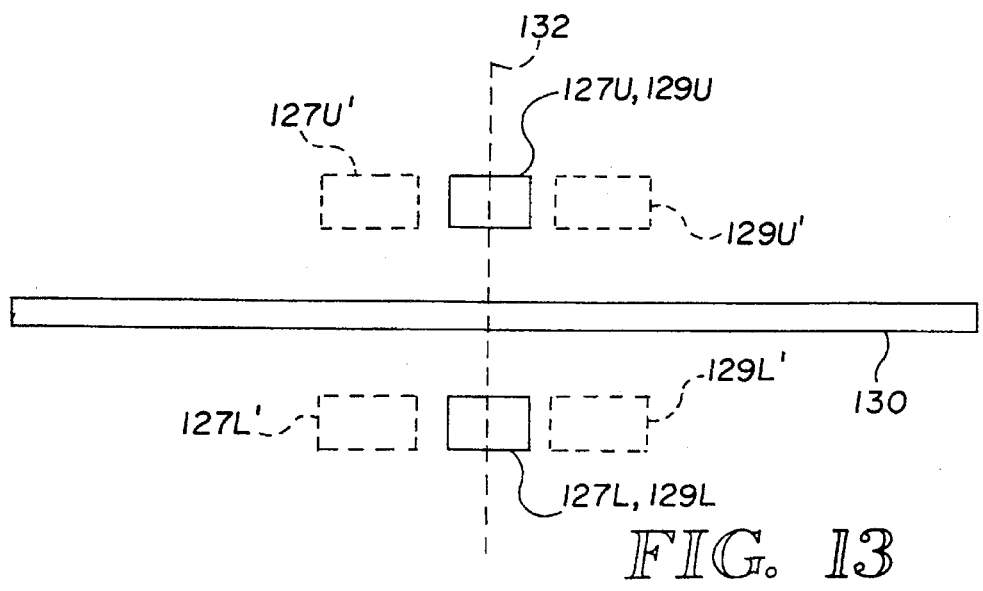
FIG. 13 is a schematic drawing of cursor images produced by the scanning laser bar code reader of FIG. 1 with the optical elements of FIGS. 11A and 11B demonstrating use for determining a focusing position of the bar code reader.

The inventive device not only enables a user to align the scanning beam on a target object, it also indicates a desired distance from the target object for optimal reading of a symbology. The performance of the scanning reader 10 is thus improved by permitting the optical components to be designed for a specific image-to-reader distance. As shown in FIG. 10, the cursor beams 126, 128, when viewed from above, are emitted from two spaced-apart locations in the reader and intersect at a focusing distance $f_{sp}$ (FIG. 9) which is a fixed distance from the window 20. At the focusing distance $f_{sp}$, the first cursor beam 126 is above the scanning plane 24 and the second cursor beam 128 is below the scanning plane 24 (FIG. 9). If a target object is placed in the path of the beams at the focusing distance $f_{sp}$, a pair of cursor images 127, 129 will be formed on the target object, as shown in FIGS. 9 and 13. The scanning beam, shown as scan line 130, will be between the two cursor beam images 127, 129.

At a distance $d_1$, less than the focusing distance $f_{sp}$, the first cursor beam 126 is to the left of the center line $l_c$ and the second cursor beam 128 is to the right of the center line $l_c$. Offset cursor images 127', 129', as shown in FIG. 9, are then formed on a target object positioned at the distance $d_1$. At a distance $d_2$, greater than the focusing distance $f_{sp}$, a pair of complementarily offset cursor images 127" and 129" is formed on the target object. When the scanning reader 10 is at the focusing distance $f_{sp}$, the cursor images 127, 129 are aligned vertically. The device thus enables the user to aim and position the scanning beam by properly aligning the cursor images 127, 129 on the target object to indicate the location of the scanning beam and the distance of the scanning reader 10 from the target object.

In addition to being redirected, the light of the scanning beam which strikes the first and second end portions 122, 124 can also be reshaped. In the absence of shaping, the scanning beam has an elliptical shape when it is in the center of its angular range of travel. It is possible to transform the shape of the scanning beam to a substantially circularly shaped cursor beam when it is at the extremes of its travel. This allows light in the cursor beams to be substantially increased in brightness by concentrating all of the optical energy into a smaller cross-sectional area. Reshaping beams using segmented or gradient surfaces or holographic elements is well known in the art and can be achieved, for example, by varying the separation of segments or providing a curved segmented section.

Figure 11A:
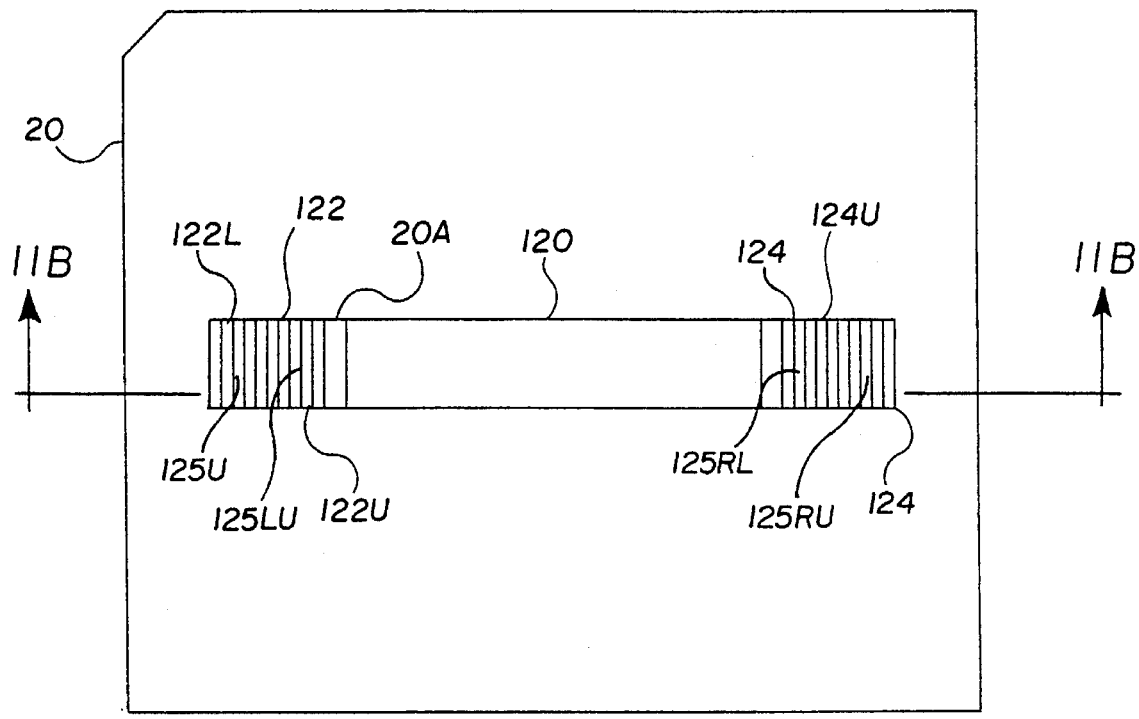
FIG. 11A is a plan view of a third embodiment of the optical element of the scanning laser bar code reader of FIG. 1.
Figure 11B:
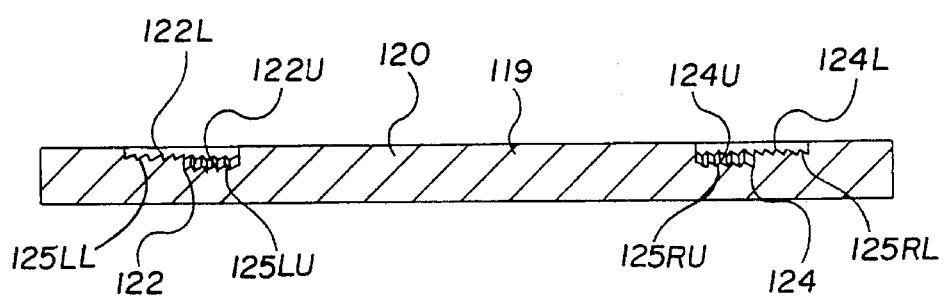
FIG. 11B is a cross-sectional view taken substantially along lines 11A–11B of FIG. 11A.
Figure 12:
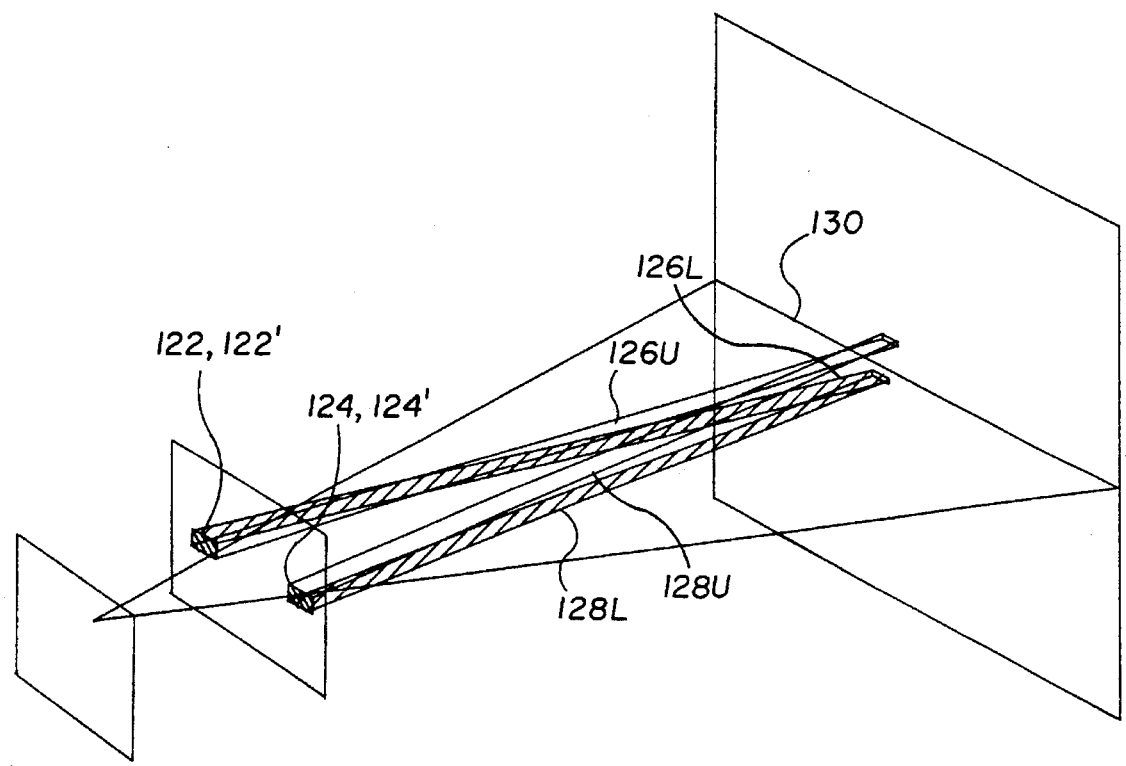
FIG. 12 is a schematic drawing of a portion of the visible beams formed by the third embodiment of the optical element of FIGS. 11A and 11B.

In an alternative embodiment of the optical element 20 shown in FIGS. 11A, 11B and 12, the optical element 20 is substantially similar to that of the previously discussed embodiments, except that each of the second and third portions 122 and 124 includes a pair of subportions 122U, 122L, and 124U, 124L each having an upper segmented surface 125LL, 125LU, and 125RL, 125RU, respectively. The upper segmented surfaces 125LL and 125LU of the left portion 122 and the upper segmented surfaces 125RL and 125RU of the right portion 124 are tilted down and up, respectively at equal and opposite angles to the plane of the upper surface 119 of the central portion 120.

The subportions 122U, 124U, 122L and 124L redirect the light entering them when the scanning beam is at its extremes of travel. While the scanning beam is incident upon the second end portion 122, the end portion of the scanning beam is directed both above and below the central portion of the scanning beam by the second end portion's subportions because the upper segmented surfaces 125LL and 125LU are tilted oppositely with respect to each other. Light passing through the upper segmented surfaces 125LL and 125LU is thus directed below and above the scan line 130, respectively. This forms a pair of cursor beams 126U, 126L as shown in FIG. 12.

At the other extreme of travel, the emitted beam of visible light is redirected by the subportions 124U and 124L of the first end portion 124. Light passing through the upper segmented surfaces 125LU and 125RU of the first end portion 124 is directed below and above the scan line 130, respectively, because the upper segmented surfaces 125RL and 125RU are tilted with respect to each other. This forms two cursor beams 128U and 128L as shown in FIG. 12.

One pair of cursor beams 126U, 128U which includes one beam from each of the first and second end portions 122, 124 is directed above the scanning line 130. The remaining two cursor beams 126L, 128L are directed below the scan line 130. The upper pair of cursor beams 126L, 128L and the lower pair of cursor beams 126U, 128U converge as the scanning reader 10 approaches the focusing distance $f_{sp}$. As with the previous embodiments, when the scanning reader 10 is held too close to the surface on which the symbologies may be located, the cursor beams 126U, 126L created when the scanning beam is at its leftmost extreme of travel intersect the surface of the target object to the left of the line $1_c$ where the optical axis intersects the surface. Similarly, when the scanner is held too far from the surface on which the symbologies may be located, the cursor beams 128U, 128L created when the scanning beam is at its leftmost extreme of travel intersect the surface of the target object to the right of the position where the optical axis intersects the surface. The cursor beams 128U, 128L created, by the second portion 124 will be complementarily offset, depending upon the distance of the target object.

If the scanning reader 10 is at the distance $d_1$ the cursor beams 126U, 126L, 128U, 128L impinge upon a target object to form two offset pairs of cursor images 127U', 127L' and 129U', 129L', as shown in FIG. 13. When the scanning reader 10 is held at the focal distance $f_{sp}$ from the surface, the two pairs of cursor images 127U', 129U' and 127L', 129L' coincide to form two pairs of double images 127U, 129U and 127L, 129L, as shown in FIG. 13. The double images, when fully overlapped, indicate that the scanning reader is being held at the focusing distance $f_{sp}$. The user is then able to align the scanning reader 10 to a target object and position it to the focusing distance $f_{sp}$ merely by moving the scanning reader 10 to bring the two pairs of cursor images 127U, 127L and 129U, 129L together.

Segmented or gradient surfaces are preferred for the upper surfaces of second and third portions 122, 124 of each of the embodiments discussed above, because unlike holographic elements, they will not be subject to "ghosting." That is, they will not cause ghost images to be produced beyond the angular extreme of the scanned visible light beam. However, any of segmented surfaces, gradient surfaces and holographic optical elements is within the scope of the invention and any of them can be created by mass-production techniques.

While the detailed description above has been expressed in terms of a specific example, those skilled in the art will appreciate that many other elements could be used to accomplish the purpose of the disclosed inventive apparatus. Accordingly, it can be appreciated that various modifications of the above-described embodiments may be made without departing from the spirit and the scope or the invention. Therefore, the spirit and the scope of the present invention are to be limited only by the following claims.

I claim:

1. An apparatus for forming a visible scanning beam and cursor beam for use in a scanning reader, comprising:

a source for producing a beam of light, said beam being visible light;

a scanning element receiving said beam of light and causing said beam of light to scan over a predetermined angular range in a scan plane to form a visible scanning beam from said beam of light; and an optical element for receiving said scanning beam from said scanning element, said optical element being operative to transmit said scanning beam substantially unaffected when said scanning beam is in a first portion of said optical element and operative to redirect said scanning beam when said scanning beam is in a second portion of said optical element to form a first cursor beam, the second portion of said optical element being positioned to receive said scanning beam from said scanning element when scanning over a portion of said angular range adjacent to the angular extreme of the angular range, said optical element further being operative to redirect said scanning beam when said scanning beam is in a third portion of said optical element to form a second cursor beam spaced apart from said first cursor beam, wherein said optical element is operative to redirect said first and second cursor beams such that said first cursor beam is directed above the scanning beam transmitted by the first portion and said second cursor beam is directed below the scanning beam transmitted by the first portion.

2. The symbology reader of claim 1 wherein said first and second portions comprise segmented surface, tilted with respect to said first portion of the optical element.

3. A symbology reader, comprising:

a source for producing a beam of light, said beam being visible light;

a scanning element receiving said beam of light and causing said beam of light to scan over a predetermined angular range in a scan plane to form a visible scanning beam; and an optical element operative to redirect said scanning beam when said scanning beam is in a first portion of said optical element to form a first cursor beam, wherein said optical element is operative to redirect said scanning beam when said scanning beam is in a second portion of said optical element to form a second cursor beam spaced apart from said first cursor beam and wherein said first and second portions redirect said first and second cursor beams above and below said scan plane respectively.

4. The symbology reader of claim 3, wherein the first and second portions are selected to redirect said first and second cursor beams along respective beam direction to minimize the distance between the cursor beams at a predetermined focusing distance from said source producing said beam of light.

5. An apparatus for forming a visible spotter beam and cursor beam for use in a scanning reader having a scanning beam, comprising:

a first source for producing a first beam of light, said first beam being visible light;

a second source for producing a second beam of light;

a scanning element receiving said first and second beams of light and causing said first and second beams of light to scan over a predetermined angular range in a scan plane to form a visible spotter beam from said first beam and a scanning beam substantially aligned with said spotter beam from said second beam; and an optical element for receiving said spotter beam from said scanning element, said optical element being operative to transmit said spotter beam substantially unaffected when said spotter beam is in a first portion of said optical element and operative to redirect said spotter beam when said spotter beam is in a second portion of said optical element to form a first cursor beam, wherein said second portion of said optical element is positioned to receive said spotter beam from said scanning element when scanning over a portion of said angular range adjacent to the angular extreme of the angular range, wherein said optical element is operative to redirect said spotter beam when said spotter beam is in a third portion of said optical element to form a second cursor beam spaced apart from said first cursor beam, and wherein said optical element is operative to redirect said first and second cursor beams such that said first cursor beam is directed above the scanning beam and said second cursor beam is directed below the scanning beam.

6. The symbology of claim 5 wherein said first and second portions comprise segmented surfaces, tilted with respect to said first portion of the optical element.

7. A method for forming a visible spotter beam of light having a cursor beam, comprising the steps of:

(a) forming a first beam of visible light;

(b) forming a second beam of light;

(c) causing the first beam of visible light to scan over a first predetermined angular range to form a spotter beam;

(d) causing the second beam of light to scan over a second predetermined angular range such that the second beam is substantially coincident with the first beam during at least a portion of the second predetermined angular range to form a scanning beam; and (e) redirecting the spotter beam to form a cursor beam as the spotter beam is scanned along a selected portion of the first predetermined angular range by positioning a segmented surface such that the direction of the spotter beam is altered when the spotter beam is in the selected portion of the first predetermined angular range.

* * * * *